US011080653B2

(12) United States Patent
Elazary et al.

(10) Patent No.: US 11,080,653 B2
(45) Date of Patent: Aug. 3, 2021

(54) VIRTUAL PUT WALL

(71) Applicant: inVia Robotics, Inc., Westlake Village, CA (US)

(72) Inventors: Lior Elazary, Agoura Hills, CA (US); Daniel Frank Parks, II, Los Angeles, CA (US); Randolph Charles Voorhies, Sherman Oaks, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 189 days.

(21) Appl. No.: 16/362,231

(22) Filed: Mar. 22, 2019

(65) Prior Publication Data
US 2020/0302390 A1 Sep. 24, 2020

(51) Int. Cl.
G06Q 10/08 (2012.01)
G06Q 30/06 (2012.01)
G06Q 10/06 (2012.01)

(52) U.S. Cl.
CPC ... *G06Q 10/0875* (2013.01); *G06Q 10/06316* (2013.01); *G06Q 10/0832* (2013.01); *G06Q 30/0633* (2013.01)

(58) Field of Classification Search
None
See application file for complete search history.

(56) References Cited

U.S. PATENT DOCUMENTS 9,305,281 B2 * 4/2016 Waddington ..... G06Q 10/08355

\* cited by examiner

*Primary Examiner* — Paul Danneman
(74) *Attorney, Agent, or Firm* — Ansari Katiraei LLP; Arman Katiraei; Sadiq Ansari

(57) ABSTRACT

A virtual put wall system includes a storage apparatus with multiple containers, and different container identifiers attached to the containers. The system includes databases storing a first mapping that maps each customer order of a plurality of customer orders to a different container, a second mapping that maps each container to a different container identifier attached to that container, and a different visual identifier of each container. The system also includes a display device and a coordinating device that detects retrieval of an object, determines that the object belongs to a particular customer order, selects, based on the second mapping, a particular container that is used to store objects of the particular customer order, and directs the transfer of the object to the particular container by modifying the display device to present a particular visual identifier of the particular container.

20 Claims, 12 Drawing Sheets

US 11,080,653 B2

VIRTUAL PUT WALL

BACKGROUND INFORMATION

Automation may be implemented to increase productivity and efficiency. Automation involves replacing human or manually performed tasks with tasks that are performed by autonomous robots or machines.

In some cases, the cost of automation and the automation implementation time may exceed the benefit that is gained from the resulting automation. In other cases, automation may already be implemented, but the automation productivity and efficiency may still be improved.

Various assistive tools may supplement existing manually-performed tasks or automated tasks, and may serve as another manner with which to increase productivity and efficiency. Assistive tools may optimize operations that are performed by a robot or human, without overtaking or replacing the underlying workflow.

DETAILED DESCRIPTION OF PREFERRED EMBODIMENTS

The following detailed description refers to the accompanying drawings. The same reference numbers in different drawings may identify the same or similar elements.

Order fulfillment and inventory management are fields that are continually being optimized for increased productivity and efficiency. An illuminated put wall may be an assistive tool that can be used to increase order fulfillment and/or inventory management productivity and efficiency. The illuminated put wall may be used to increase worker (e.g., human and/or robot) productivity and efficiency with respect to sorting tasks, object transfer tasks, and/or other object grouping tasks. For example, order fulfillment may involve retrieving different objects, that are part of a same order, from different storage locations, and placing the retrieved objects of the same order together at a specific location, container, and/or destination at the illuminated put wall.

The illuminated put wall may improve productivity and efficiency by quickly and easily identifying for a worker where a retrieved object should be placed. In doing so, the worker, whether a human or a robot, need not spend time and/or resources locating the specific location, container, and/or destination where the retrieved objects of an order are grouped together.

Figure 1:
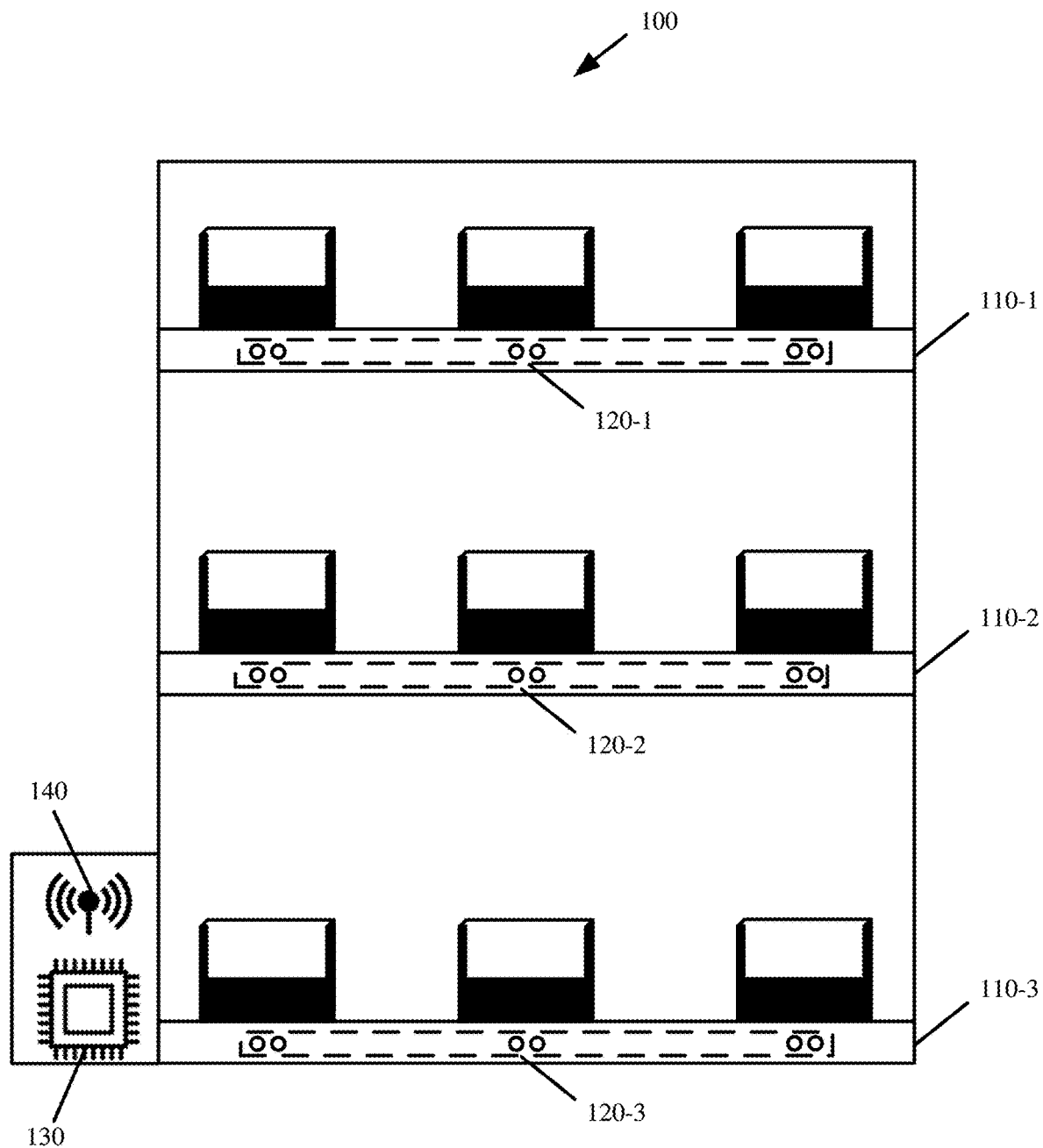
FIG. 1 illustrates an example of an illuminated put wall.

FIG. 1 illustrates an example of an illuminated put wall 100. As shown in FIG. 1, illuminated put wall 100 may be a specialized storage apparatus with shelving 110-1, 110-2 and 110-3 (herein sometimes collectively referred to as "shelving 110" or individually as "shelf 110") that is integrated with illuminating inputs 120-1, 120-2, 120-3 (herein sometimes collectively referred to as "illuminating inputs 120" or individually as "illuminating input 120"). Illuminated put wall 100 may further include controller 130 and network connectivity 140.

Shelving 110 may include platforms, ledges, and/or another surface for item retention. In some embodiments, shelving 110 may retain boxes, totes, and/or other containers. Each container may be used to compile different objects of a different customer order.

Illuminating inputs 120 are at fixed locations about shelving 110. The positions of illuminating inputs 120 may be aligned with positions of different containers on shelving 110 that are used to compile objects of different customer orders. Illuminating inputs 120 may include one or more indicators that can turn on and off and/or can illuminate with different colors in order to assist workers in quickly and easily identifying where a retrieved object should be placed and/or identifying the status of each order on illuminated put wall 100.

The indicators of illuminated inputs 120 may include physical lights or displays that provide visual signals. For instance, a first light may turn on with a first color to indicate where to place a retrieved object on shelving 110, and the first light or a different second light may turn on with a second color to indicate when objects at a corresponding shelving 110 location should be removed as a result of a completed order (e.g., an order where all objects have been retrieved and placed to the corresponding shelving 110 location).

Illuminating inputs 120 may further include push buttons, touch-sensitive displays, and/or other interactive elements that can receive worker input. The buttons may be integrated as part of the indicators, or may be disposed as separate buttons next to the indicators. Workers may interact with the buttons to confirm a completed operation.

Controller 130 may coordinate the illumination of illuminating inputs 120 based on different retrieved objects that are brought before illuminated put wall 100. In particular, controller 130, via network connectivity 140, may receive an identifier for an object that a worker brings before illuminated put wall 100. Controller 130 may determine the container that is associated with the customer order for that object, may identify the position of the container about shelving 110, and may activate an illuminating input 120 at the identified position with a first color. The first color may identify where the retrieved object should be placed about illuminated put wall 100. The worker bringing the object, or another worker at illuminated put wall 100, may visually see which of illuminated inputs 120 is activated with the first color, and may place the retrieved object in the container at the position of that illuminated input 120.

When the object is placed in the container, the worker may press or otherwise interact with the activated illuminated input 120 to confirm that the object was placed in the correct container. Controller 130 may update status of the customer order and/or inventory based on the received input.

When controller 130 detects that all objects of a customer order have been placed in a corresponding container, controller 130 may indicate the completed status of that customer order by activating the illuminated input 120 at the position of the corresponding container with a different second color. The second color may indicate that the customer order is complete and the corresponding container may be removed from illuminated put wall 100. A worker may detect the second color illuminating at a specific location or specific illuminated input 120 on illuminated put wall 100, identify the container with the completed order that is directly aligned with that activated illuminated input 120, remove the container, insert a new and/or empty container in place of the removed container on shelving 110, and press and/or interact with that activated illuminated input 120 to notify controller 130 that the completed order has been removed from illuminated put wall 100 and/or a new container has been added to illuminated put wall 100 for receipt of a new or different customer order.

Accordingly, illuminated put wall 100 may be an assistive tool for increasing worker productivity and efficiency. However, many sites and/or operators may be hesitant to incorporate illuminated put wall 100 and/or other put walls that require specialized hardware because of the cost and time to do so. For instance, illuminated put wall 100 requires shelving 110 with integrated sets of illuminated inputs 120. The specialized hardware raises the cost of using illuminated put wall 100 by requiring operators to modify their site and/or replace their existing equipment (e.g., racks, shelving, etc.) with one or more put walls 100, or by retrofitting existing racks with illuminated inputs 120.

The specialized hardware (e.g., illuminated inputs 120) also limits usage of illuminated put wall 100. For instance, illuminated put wall 100 illustrated in FIG. 1 supports a maximum of 9 containers at any given time, meaning that only 9 customer orders can be concurrently filled at one time unless additional illuminated put walls 100 are used. In other words, illuminated put wall 100 cannot adapt to support additional containers or customer orders when the containers and/or retrieved objects are of a smaller size, or when the customer orders are for a small quantity of objects.

To address these shortcomings, some embodiments provide a virtual put wall system that minimizes implementation cost, allows for the reuse of existing equipment, and provides a dynamically adapting solution that accommodates different containers and/or customer orders of different sites. The virtual put wall system is an assistive tool that provides similar if not greater productivity and efficiency improvements than illuminated put wall 100 without imposing the financial cost of specialized hardware on the operator or the implementation cost of replacing or retrofitting existing hardware.

Figure 2:
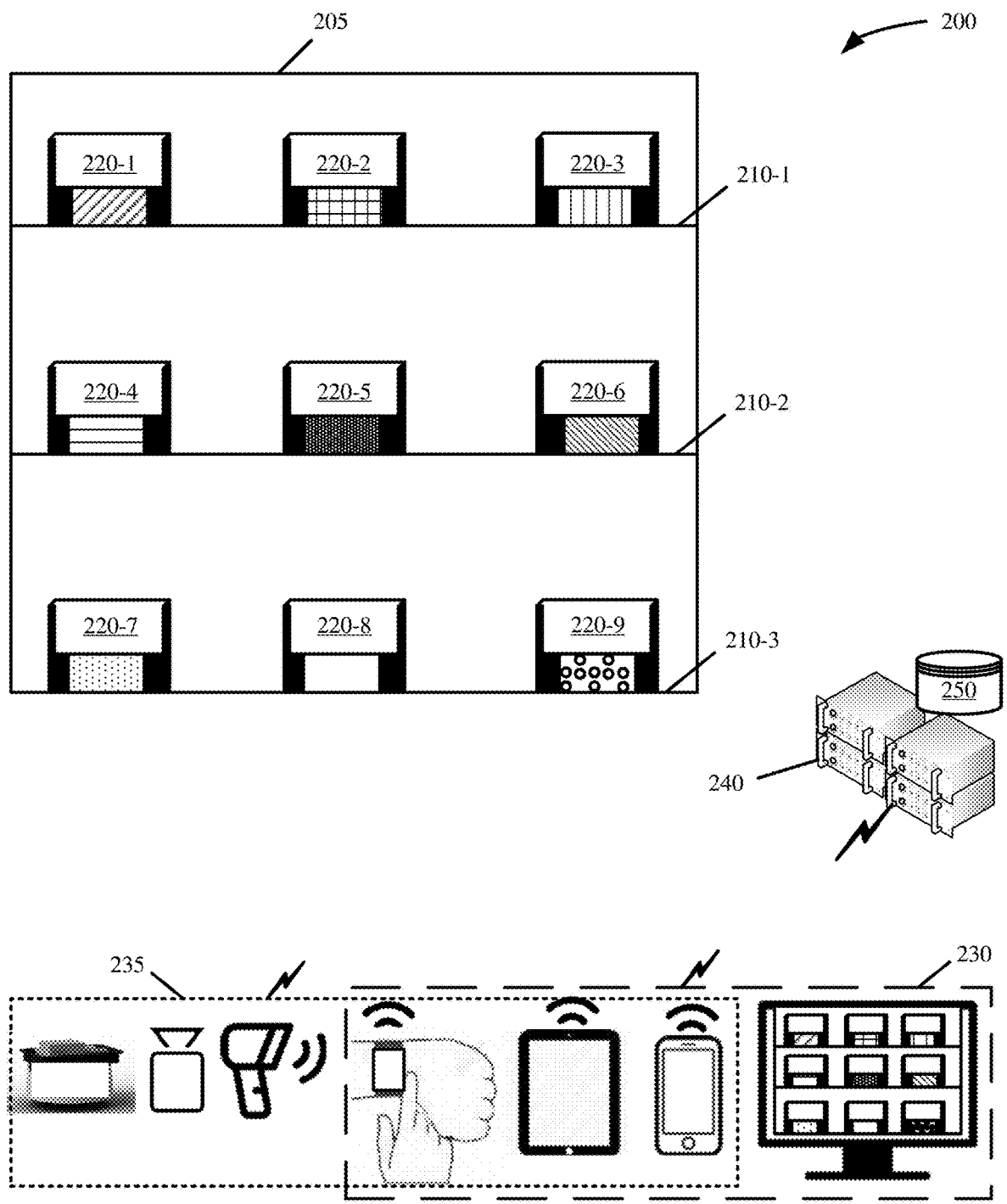
FIG. 2 illustrates an example of a virtual put wall system in accordance with some embodiments described herein.

FIG. 2 illustrates an example of a virtual put wall system 200 in accordance with some embodiments described herein. Virtual put wall system 200 may include rack 205 with shelving 210-1, 210-2, and 210-3 and containers 220-1, 220-2, 220-3, 220-4, 220-5, 220-6, 220-7, 220-8, and 220-9 (herein sometimes collectively referred to as "containers 220" or individually as "container 220"). Virtual put wall system 200 may further include one or more display devices 230, one or more input devices 235, virtual put wall coordinator 240, and one or more databases 250.

Rack 205 may be a storage apparatus for retaining two or more containers 220, and may correspond to any one or more storage apparatus that exist in a site. Although, rack 205 is illustrated with three shelves 210-1, 210-2, and 210-3, rack 205 can be of different sizes and/or heights that can support more or less shelves 210. Unlike the fixed and static illuminated put wall 100, virtual put wall system 200 can be integrated as part of, and/or adapted to work with, racks 205 of different sizes and with shelving 210 of different quantities, configurations, and/or sizes. For instance, virtual put wall system 200 can be used in conjunction with a first rack having three shelves of a first width and with a second rack having five shelves of a different second width.

Shelving 210 may correspond to platforms, ledges, and/or another surface at different levels of rack 205. Shelving may be used to store different quantities of containers 220. Unlike illuminated put wall 100, virtual put wall system 200 can dynamically adapt to different numbers of containers 220 on each shelf 210, and also different positioning of containers 220 about each shelf 210.

Unlike shelving 110 of illuminated put wall 100, shelving 210 of virtual put wall 200 does not have specialized hardware (e.g., no illuminated indicators, integrated buttons, and/or sensors) and/or electronics. More generally, rack 205 need not have any specialized hardware, lights, buttons, and/or electronics, and can be a simple steel, metal, plastic, or other structure.

Containers 220 may include boxes, totes, receptacles, and/or other apparatus for storing different sized objects. Containers 220 may be of equal or different sizes. For instance, containers 220 of a first size may be used to store customer orders with large-sized objects, and containers 220 of a smaller second size may be used to store customer orders with small-sized objects. Similarly, containers 220 of the first size may be used to store a large quantity of objects for a large customer order, and containers 220 of the smaller second size may be used to store a small quantity of objects of a small customer order.

Containers 220 may be distributed across shelving 210. For instance, as shown in FIG. 2, each shelf 210 may be sized to retain a leftmost container (e.g., container 220-1), a middle container (e.g., container 220-2), and a rightmost container (e.g., container 220-3). Virtual put wall system 200 supports other arrangements of containers 220, different arrangements of containers 220 on different shelves 210, arrangements that change over time, and/or any custom arrangement of containers 220 that is desired in direct contrast to the fixed and static arrangement of containers that is only supported by illuminated put wall 100 because of its specialized hardware. As will be described in greater detail below, the dynamic arrangement of containers 220 supported by virtual put wall system 200 may be based on a coordinator-controlled or a worker-controlled allocation of containers 220 about shelving 210.

Containers 220 of virtual put wall system 200 may be visually differentiated from one another using different salient queues. For instance, each container 220 may include a visual differentiator from a set of different visual differentiators.

The visual differentiator may be a visual feature, pattern, color, shape, visual characteristic, and/or other salient queue by which two or more containers 220 about a common shelf 210 or all shelves 210 can be visually distinguished from one another. The visual differentiator may be embedded as part of a container 220, or may be attached or otherwise coupled to a container 220.

In some embodiments, the visual differentiators (e.g., salient queues) may include stickers or signage with one or more different features, patterns, colors, shapes, and/or visual characteristics. A different sticker may be placed on a front-facing surface of each container 220 on a shelf 210 or all shelves 210. In this manner, virtual put wall system 200 can integrate and/or work with existing shelving at a site, and also existing containers 220 used within the site. All that is required to use existing containers 220 with virtual put wall system 200 is to place the visually differentiating stickers or signage on containers 220.

Display devices 230 may provide the interface between a worker and containers 220 distributed about shelving 210. For instance, display devices 230 may change to identify different containers 220 for retrieved objects that are being placed and/or sorted by the worker. Display devices 230 may include stationary displays, that are at a fixed location near or on rack 205, or mobile displays, that can be carried on one's person. For instance, display device 230 may be a monitor or television that is attached to or located adjacent to shelving 210 so that it is directly in the worker's line of sight when placing objects into containers 220.

Display devices 230 may include a wireless radio to communicate with coordinator 240. The wireless radio allows coordinator 240 to control display devices 230 (e.g., change the displays) and/or receive input from display devices 230.

In some embodiments, display devices 230 may include interactive displays (e.g., touchscreens and/or displays with other input devices) that workers can interact with in order to provide input to coordinator 240. Accordingly, display devices 230 may include and/or operate as input devices 235. For instance, display device 230 may be a smartphone, tablet, or wearable display (e.g., watch on a human wrist).

In some embodiments, display device 230 may include non-interactive displays, and input may be provided by the worker to coordinator 240 via other input devices 235. Input devices 235 may include devices that allow a worker to interface and/or provide input to virtual put wall system 200 and, specifically, to coordinator 240.

In some embodiments, input devices 235 may include scanners, readers, cameras, sensors, and/or other devices that are integrated as part of or separate from display devices 230. Input devices 235 may capture various identifiers (e.g., fiducials, barcodes, Quick Response ("QR") codes, patterns, symbols, and/or other visual markers) associated with retrieved objects, containers, rack 205 positions, etc., and may convey the captured information to coordinator 240 via a wireless radio and/or wireless network. Input devices 235 may be portable devices that can be carried by workers, or may include devices that are located near rack 205. Input devices 235 may also include autonomous robots that are integrated as part of virtual put wall system 200.

Input devices 235 may provide coordinator 240 with information about objects that are retrieved from different storage locations and/or that are brought to rack 205 for sorting and/or placement in correct containers. Input devices 235 may also provide coordinator 240 with information about completed tasks, and/or information that coordinator 240 may use to determine if a task was completed correctly.

Coordinator 240 may direct and/or control the transfer of objects from different storage locations to correct containers distributed about rack 205. In some embodiments, coordinator 240 may control operations of the autonomous robots and/or may direct other workers based on wireless messaging passed to the robots and/or display devices 230 and/or inputs received from display devices 230 or input devices 235.

Coordinator 240 issued signaling to display devices 230 identify where objects should be placed, which containers 220 contain completed orders, and/or other information to increase the productivity and efficiency of the worker. The worker issued signaling, that is input using display device 230 and/or input device 235 and that is provided to coordinator 240, may provide status for tasks assigned to the worker (e.g., confirming placement of an object in a correct container 220, confirming removal of a container 220 from rack 205, confirming insertion of a new container 220 onto rack 205, etc.). In some embodiments, coordinator 240 may be a device or machine for controlling display devices 230, other devices, and/or robots in a site, and for controlling the transfer of objects within the site.

Coordinator 240 may change the display of display device 230 based on data received from display devices 230 and/or input devices 235. The data may be provided in response to workers retrieving objects from different storage locations, bringing the retrieved objects to rack 205, transferring the retrieved objects to containers 220 on rack, moving containers 220, and/or interacting with rack 205 or containers 220 in other ways. Coordinator 240 may use the data to synchronize operations of different workers, and to optimize subsequent worker tasks in order increase worker productivity and efficiency.

Coordinator 240 may be communicably coupled to databases 250. Databases 250 may store the mapping of containers 220 to different locations about shelving 210 of rack 205, the mapping of visual identifiers or salient queues to containers 220, the mapping of customer orders to containers 220, the status of each customer order (e.g., remaining objects that have yet to be entered into an associated container 220), the mapping of fiducials to different shelving 210 locations, and/or data used by coordinator 240 to synchronize, optimize, and/or guide the workers.

Figure 3:
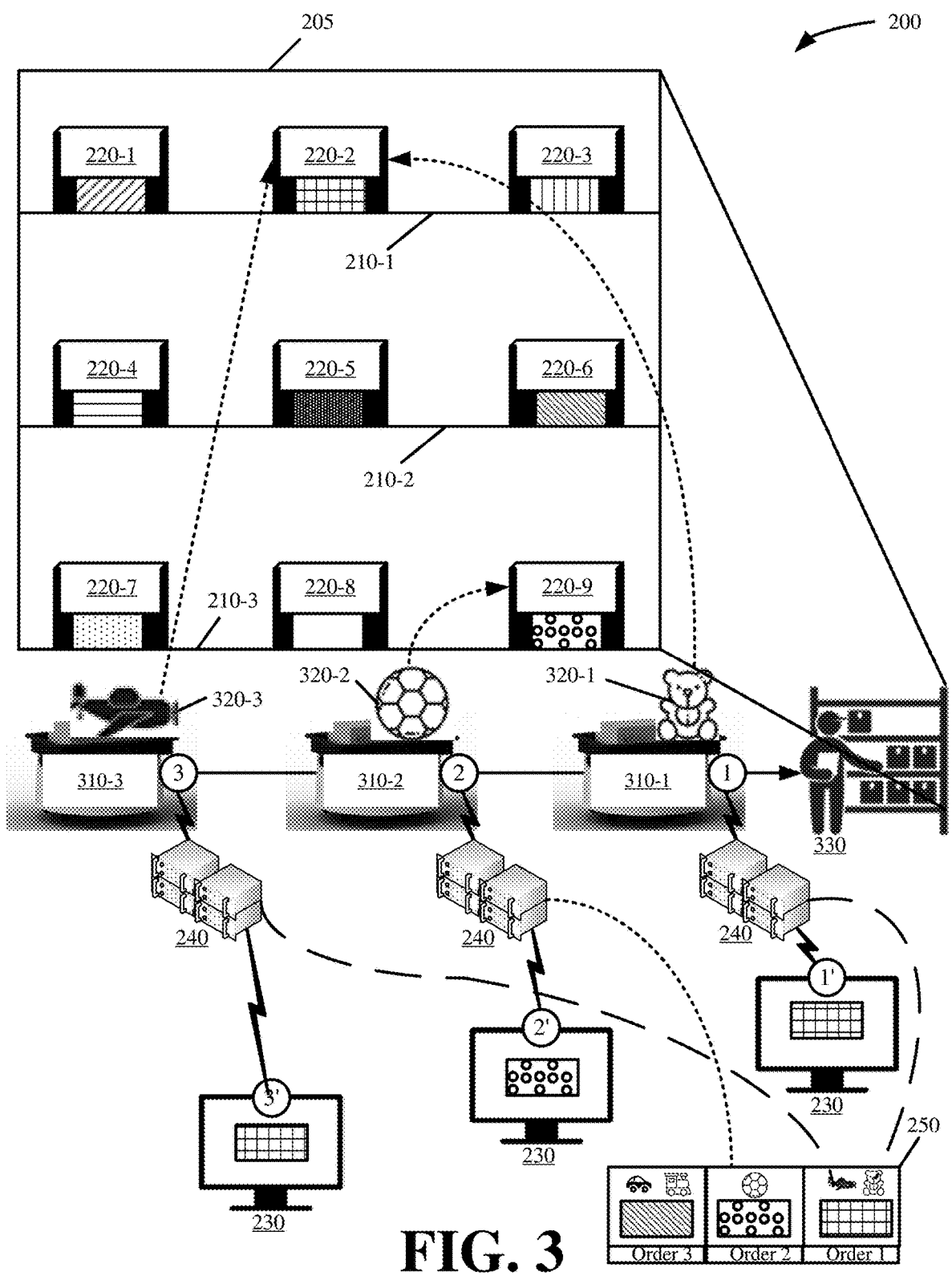
FIG. 3 illustrates example operation of virtual put wall system in accordance with some embodiments described herein.

FIG. 3 illustrates example operation of virtual put wall system 200 in accordance with some embodiments described herein. FIG. 3 includes different autonomous robots 310-1, 310-2, and 310-3 (herein sometimes collectively referred to as "robots 310" or individually as "robot 310") delivering different objects 320-1, 320-2, and 320-3 to worker 330 at different times. Worker 330 transfers the delivered objects 320 to containers 220 based on the signaling, guidance, and/or direction provided by coordinator 240 via display device 230.

In particular, robot 310-1 may issue (at 1), at a first time, a first signal or message to coordinator 240 in response to delivering first object 320-1 to rack 205 and/or worker 330. The first signal or message may include an identifier for identifying first object 320-1. The identifier may include a barcode, QR code, pattern, symbol, and/or alphanumeric sequence for identifying first object 320-1. In some embodiments, the identifier may include an image of first object 320-1 that is taken using a camera of first robot 310-1 at the time of retrieving first object 320-1 from a storage location.

In some embodiments, worker 330 may obtain and provide the identifier of first object 320-1 to coordinator 240. For instance, robot 310-1 may deliver first object 320-1 to rack 205 and/or worker 330. Worker 330 may retrieve first object 320-1 from robot 310-1. Worker 330 may scan an identifier of first object 320-1 using input device 235 or display device 230. Input device 235 or display device 230 may then wirelessly transmit the scanned identifier to coordinator 240.

Coordinator 240 may query a database of object identifiers (e.g., database 250) with the identifier in order to identify first object 320-1, may determine from a database of customer orders (e.g., database 250) that first object 320-1 is part of a first customer order, and may determine that container 220-2 on shelf 210-1 is currently being used to store objects of the first customer order. Coordinator 240 may modify (at 1') display device 230 to instruct worker 330 to place first object 320-1 into container 220-2 that is used to store objects of the first customer order. In particular, coordinator 240 may modify (at 1') display device 230 to present the visual identifier of container 220-2. Worker 330 may then transfer first object 320-1 to container 220-2 by simply matching the visual identifier that is presented on display device 230 to the same visual identifier found on container 220-2 located on shelf 210-1 of rack 205. As a result, worker 330 does not spend any time in determining that first object 320-1 is part of the first customer order, determining which container 220 on rack 205 is used to store objects of the first customer order, and/or locating container 220-2 on rack 205.

In some embodiments, after transferring first object 320-1 to container 220-2, worker 330 may provide input (e.g., touch a task completion button) to coordinator 240 via display device 230 or other connected device (e.g., input device 235). The input may signal that worker 330 has completed the task presented on display device 230.

In some embodiments, worker 330 may provide input for verifying that first object 320-1 was correctly placed in container 220-2. For instance, container 220-2 may have a container identifier (e.g., fiducial, barcode, QR code, pattern, symbol, and/or alphanumeric sequence) that uniquely identifies container 220-2 from other containers 220, and that worker 330 can scan with a scanner, camera, or other input device 235, and can transmit to coordinator 240 to confirm correct placement of first object 320-1 in container 220-2. In some such embodiments, worker 330 may also scan an object identifier that uniquely identifies first object 320 from other objects before or after placing first object 320 in container 220-2. The scanned object identifier along with the container identifier may be transmitted to coordinator 240 to confirm that the correct object (e.g., first object 320) is placed in the correct container (e.g., 220-2).

Thereafter, coordinator 240 may direct robot 320-1 to retrieve a different object from storage, and may direct robot 310-2 to deliver second object 320-2 to rack 205 and/or worker 330. Robot 310-2 may issue (at 2), at the second time, a second signal or second message to coordinator 240 in response to delivering second object 320-2 before rack 205 and/or worker 330. The second signal or second message may include a second identifier for identifying second object 320-1.

Coordinator 240 may look up the second identifier against the database of object identifiers (e.g., database 250) to identify second object 320-2, may determine from the database of customer orders (e.g., database 250) that second object 320-2 is part of a different second customer order, and may determine that container 220-9 on shelf 210-3 is currently being used to store objects of the second customer order. Coordinator 240 may modify (at 2') display device 230 to instruct worker 330 to place second object 320-2 into container 220-9. In particular, coordinator 240 may modify (at 2') display device 230 to present the visual identifier of container 220-9. Worker 330 may provide input to notify virtual put wall system 200 that second object 320-2 was transferred to container 220-9.

Thereafter, coordinator 240 may detect, based on a third signal or third message issued (at 3) from robot 310-3 at a third time, that robot 310-3 has delivered third object 320-3 to rack 205 and/or worker 330. From a third identifier included with the third signal or third message, coordinator 240 may determine that third object 320-3 is another item of the first customer order, and may modify (at 3') display device 230 to display the visual identifier of container 220-2 so that worker 330 is instructed to place third object 320-3 in container 220-2 on shelf 210-1.

In some embodiments, coordinator 240 may use sensors to determine when different robots 310 arrive (at 1, 2, and 3) before rack 205 and/or worker 330 in order to trigger the changing (at 1', 2', and 3' respectively) of display device 230. In some embodiments, coordinator 240 may track movements of robots 310 via a wireless connection to robots 310. From the tracked robot 310 movements and/or tracked objects retrieved by robot 310, coordinator 240 may trigger the changing (at 1', 2', and 3') of display device 230. More specifically, coordinator 240 may change (at 1', 2', and 3') display device 230 in response to detecting (at 1, 2, and 3 respectively) arrival of different robots 310 with different objects at different times.

In some embodiments, coordinator 240 may modify display device 230 to present supplemental information in addition to, or instead of, the salient queues and/or visual identifiers of different containers 220. The supplemental information may assist worker 330 in more quickly completing the tasks of transferring retrieved objects to correct containers 220 on rack 205, and/or may provide worker 330 with information that better defines the tasks to be performed by worker 330.

Figure 4:
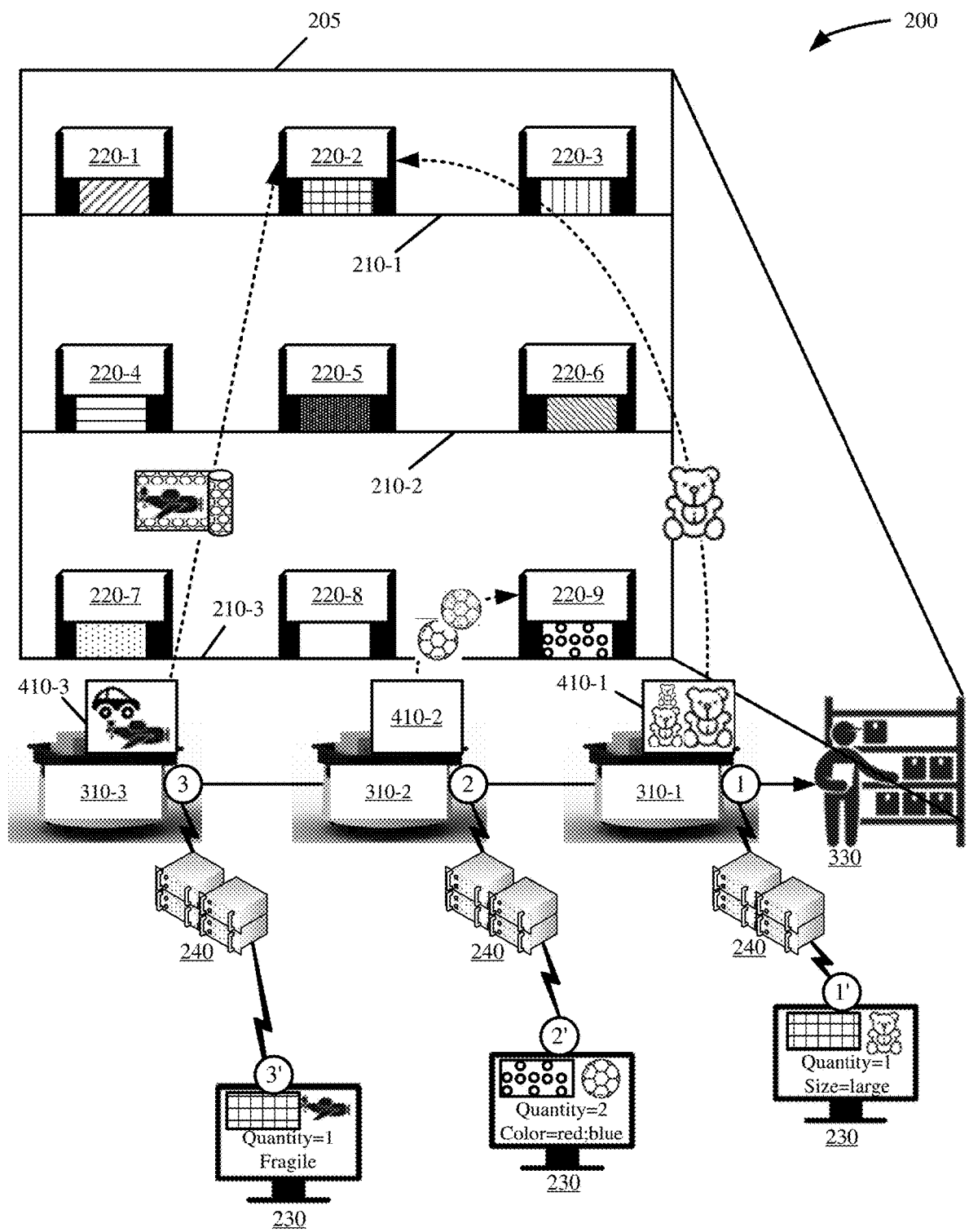
FIG. 4 illustrates an example of supplemental information that is provided by virtual put wall system in accordance with some embodiments described herein.

FIG. 4 illustrates an example of supplemental information that is provided by virtual put wall system 200 in accordance with some embodiments described herein. As shown in FIG. 4, robots 320 may retrieve different totes 410-1, 410-2, and 410-3 (herein sometimes collectively referred to as "totes 410" or individually as "tote 410") from storage instead of individual objects. Each tote 410 may contain multiple units of the same object and/or different objects. For instance, robot 310-1 may retrieve first tote 410-1 with multiple units of a first object that have different sizes, robot 310-2 may retrieve second tote 410-2 with multiple units of a second object that have different colors, and robot 310-3 may retrieve third tote 410-3 with multiple units of a third object and a different fourth object.

First robot 310-1 may issue (at 1) a signal or message with a first identifier for first tote 410-1 to coordinator 240 upon delivering first tote 410-1 before rack 205 and/or worker 330. In some embodiments, coordinator 240 may detect (at 1) the arrival of first robot 310-1 before rack 205 and/or worker 330 via sensors at virtual put wall 200 or by tracking movements of first robot 310-1. For instance, coordinator 240 may access wheel encoders or a positioning system of each robot 310 in order to track positioning of each robot 310. Coordinator 240 may also track totes 410 and/or objects that have retrieved by each robot 310 in response to robots 310 providing coordinator 240 with tote identifiers at the time of each tote 410 retrieval from storage.

Coordinator 240 may perform a lookup of the first tote identifier against a database of object and/or tote identifiers (e.g., database 250). From the lookup, coordinator 240 may determine the objects that are stored in first tote 410-1.

Coordinator 240 may query the customer order database (e.g., database 250) to determine that the first object in first tote 410-1 is part of a first customer order, and that objects of the first customer order are aggregated to container 220-2 on shelf 210-1 of rack 205. The customer order database query may also provide coordinator 240 with parameters of the first object. The parameters may differentiate the first object from other objects in first tote 410-1. For instance, first tote 410-1 may include the first object in small, medium, and large sizes, and the customer order may specify the first object in the large size. The parameters may also specify one or more of an ordered quantity, packing instructions, coloring, and/or other properties of an ordered object or of the customer order. As shown in FIG. 4, coordinator 240 may change (at 1') display device 230 to present the visual identifier of container 220-2, and the quantity of the first object in a particular size that worker 330 is to remove from first tote 410-1 and place in container 220-2 on rack 205.

FIG. 4 further illustrates robot 310-2 delivering second tote 410-2 containing the second object in different colors, and coordinator 240 determining that red and blue units of the second object are part of a second customer order that is being fulfilled in container 220-9 on rack 205. Accordingly, coordinator 240 may change (at 2') display device 230 to present the visual identifier of container 220-9, and instructions for worker 330 to transfer red and blue units of the second object from second tote 410-2 to container 220-9.

The third object stored in third tote 410-3 retrieved by robot 310-3 may include an object that is also part of the first customer order being aggregated to container 220-2. However, the third object may require special handling and/or packaging. Accordingly, when coordinator 240 changes (at 3') display device 230 at the third time coinciding with delivery of third tote 410-3 before rack 205 and/or worker 330, display device 230 may provide the visual identifier of container 220-2, the particular third object to retrieve from tote 410-3, and the special handling instruction that causes worker 330 to wrap the particular third object in a protective layer before placing the particular third object in container 220-2.

Depending on the size of rack 205, number or size of shelving 210, and number of size of containers 220, virtual put wall system 200 may be used in conjunction with a large number of containers 220 such that identifying a particular container 220 based on the particular container 220 visual identifier may take a few seconds rather than be immediately identifiable in the presence of a smaller number of containers 220. The few seconds multiplied by the number of object transfers that are made to containers 220 over time can sum to a large amount of time (e.g., several minutes) that is wasted locating containers 220 on rack 205 over an extended period of time (e.g., a shift or work day).

Furthermore, virtual put wall system 200 may support two or more containers 220 having the same visual identifier, such that locating a correct container 220 based on the visual identifier alone may be insufficient. Containers 220 with the same visual identifier may be placed on rack 205 when containers 220 are swapped out after customer orders have been completed. For instance, when a first container with a completed customer order is removed from rack 205, a new and/or empty second container may be put in its place, and the second container may have a visual identifier that is identical to the visual identifier of another container that is present at a different location of rack 205.

To optimize identification of a particular container from a large number of containers 220, and/or to support containers 220 with the same visual identifiers, coordinator 240 may dynamically track the positioning of containers 220 on rack 205, and may modify the presentation of instructions on display device 230 to include the visual identifier of a container 220 and also the placement of that container 220 on rack 205. The additional container positioning information allows worker 330 to more quickly locate a correct container 220 for an object even when rack 205 is filled with a large number of containers 220 or when two more containers 220 have the same visual identifier.

Figure 5:
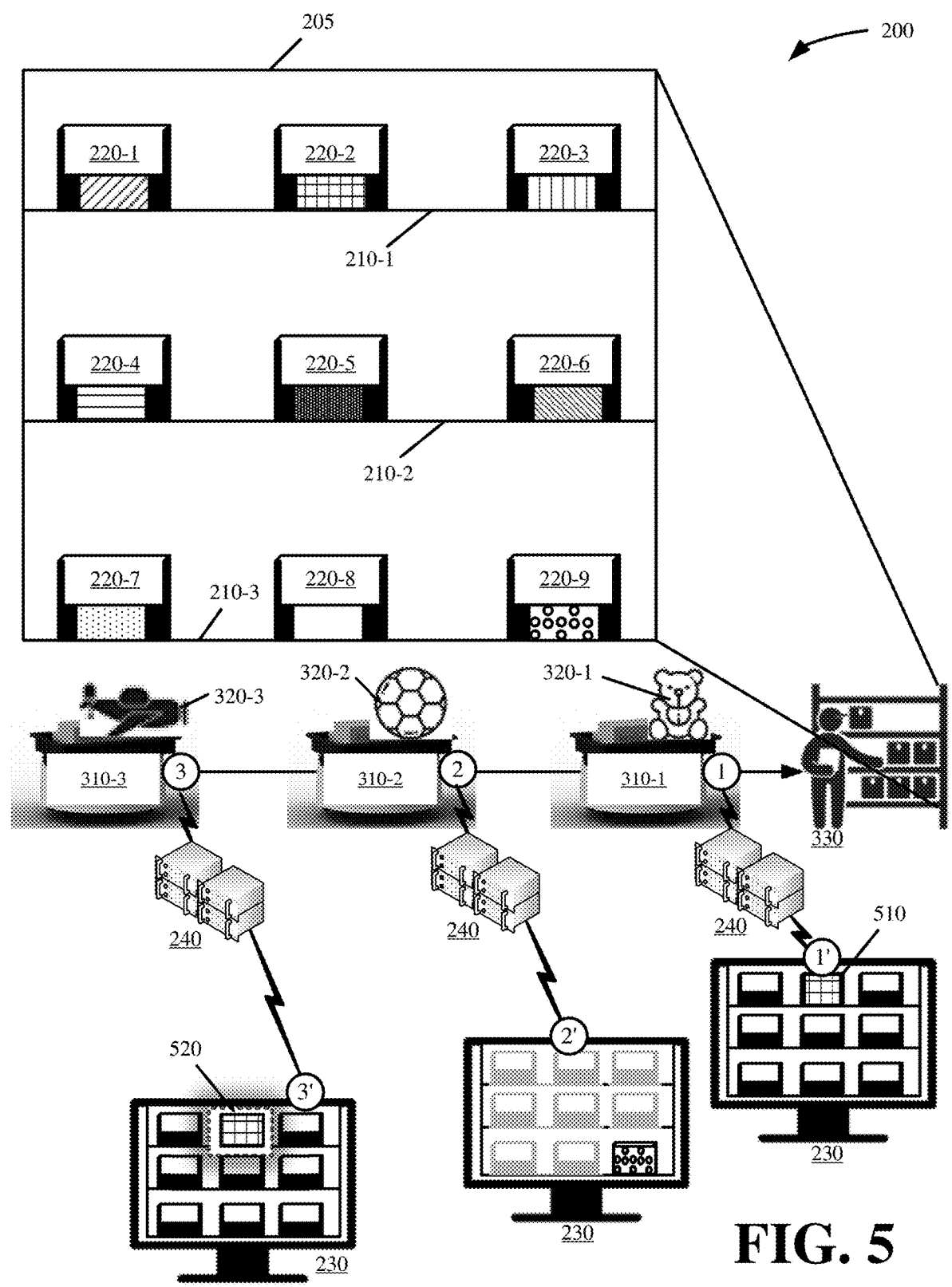
FIG. 5 illustrates virtual put wall system providing container positioning and the corresponding visual identifiers for the containers in accordance with some embodiments described herein.

FIG. 5 illustrates virtual put wall system 200 providing container 220 positioning and the corresponding visual identifiers in accordance with some embodiments described herein. In FIG. 5, when coordinator 240 modifies (at 1', 2', and 3') display device 230 based on different objects 320 that are delivered at different times, coordinator 240 determines not only the visual identifier of a correct container 220, but also the positioning of that container 220 on rack 205. Coordinator 240 may modify (at 1', 2', and 3') display device 230 to present a replicated image of rack 205 (e.g., the physical structure) and/or an arrangement of graphical elements for each container 220 that matches to the actual arrangement of containers 220 on rack 205. Coordinator may then visually differentiate the graphical representation for a particular container 220 from the graphical representation of other containers 220.

For instance, in response to robot 310-1 issuing (at 1) a first signal that indicates delivery of first object 320-1 before rack 205 and/or worker 330, coordinator 240 may determine that first object 320-1 is part of a first customer order, and may further determine that objects of the first customer order are assigned to container 220-2 on shelf 210-1 of rack 205. To identify container 220-2 and/or instruct worker 330 to transfer first object 320-1 to container 220-2, coordinator 240 may modify (at 1') display device 230 to present an arrangement of graphical elements that matches the physical arrangement of containers 220 on rack 205, and may display the visual identifier of container 220-2 on matching graphical element 510. Coordinator 240 may also modify (at 1') display device 230 to present other graphical elements corresponding to other containers 220 without a visual identifier. By referencing display device 230, worker 330 may readily identify that first object 320-1 should be placed in middle container 220-2 on shelf 210-1 of virtual put wall 200.

FIG. 5 illustrates other graphical representations for assisting worker 330 to identify the location of a container 220. For instance, to identify container 220-9 in response to signaled (at 2) delivery of second object 320-2, coordinator 240 may modify (at 2') display device 230 to fade out or remove graphical representations for all other containers 220 (e.g., containers other than container 220-9) so as to display the visual identifier of container 220-9 more prominently in a position that corresponds to a rightmost position of container 220-9 on shelf 210-3 of rack 205. Similarly, to identify container 220-2 in response to signaled (at 3) delivery of third object 320-3, coordinator 240 may modify (at 3') display device 230 to highlight and/or otherwise differentiate graphical representation 520 for container 220-2 from the graphical representations of other containers 220.

As noted above, virtual put wall system 200 may support dynamic placement of containers 220 about shelving 210. For instance, when a first container on rack 205 is full or has all objects of a particular customer order, the first container may be removed from rack 205, and a different second container may be put in its place. The second container may have a different visual identifier than the first container. Virtual put wall system 200 can adapt to the changing containers 220 and/or visual identifiers in order to support the dynamic placement of containers 220.

In some embodiments, the dynamic placement of containers 220 may include virtual put wall system 200 adapting to a coordinator-controlled allocation of containers 220. In some such embodiments, coordinator 240 may control which containers 220 are swapped out of rack 205, and which new containers 220 are inserted in their place.

Figure 6:
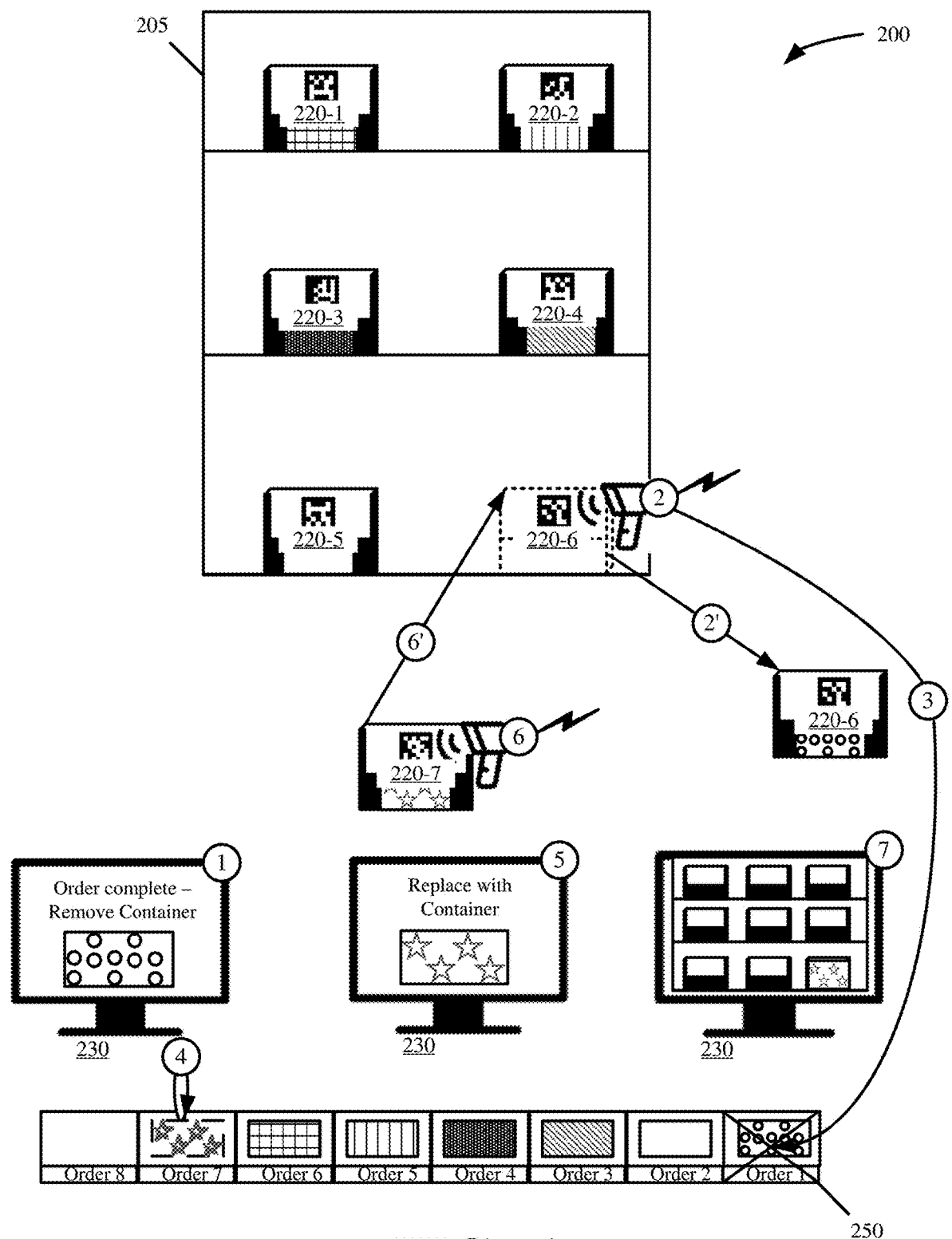
FIG. 6 illustrates a coordinator-controlled allocation of containers for virtual put wall system in accordance with some embodiments described herein.

FIG. 6 illustrates the coordinator-controlled allocation of containers 220 for virtual put wall system 200 in accordance with some embodiments described herein. FIG. 6 illustrates rack 205 with an allocation of six different containers 220, and the visual identifiers for containers 220 of FIG. 6 have been changed from the visual identifiers of previous figures. Also, coordinator 240 is not shown in FIG. 6 to simplify the figure.

The coordinator-controller allocation may be performed in response to coordinator 240 detecting that all objects of a first customer order have been placed in container 220-6 such that the first customer order is complete. Consequently, and as shown in FIG. 6, coordinator 240 may modify (at 1) display device 230 to present the visual identifier of container 220-6, other identifying information of container 220-6, and/or instruction to remove container 220-6 with the completed first customer order from rack 205.

A worker may scan (at 2) a container identifier of container 220-6 in response to the instruction. The container identifier may be the same or different from the visual identifier of container 220-6. For instance, the visual identifier may be a color, whereas the container identifier may be a fiducial that encodes a unique value used to identify container 220-6. When the container identifier is different from the visual identifier, the container identifier may be a second sticker that can be placed on each container 220 and that is different than first sticker bearing the visual identifier. The worker may use a device, such as a scanner, reader, and/or other input device 235, to scan (at 2) the container identifier.

The container identifier may be sent to coordinator 240 to confirm that the worker is retrieving the correct container 220-6, and the worker may remove (at 2') container 220-6 from rack 205. Coordinator 240 may update (at 3) customer order database 250 to track the completed status of the first customer order, and/or to update (at 3) the tracking of containers 220 on rack 205.

Coordinator 240 may select (at 4) container 220-7 to take the place of container 220-6 on rack 205, and may associate container 220-7 to a pending customer order in customer order database 250 that is awaiting fulfillment and/or that is currently not assigned to rack 205. In some embodiments, coordinator 240 may track all containers 220 in a site. For instance, when setting up virtual put wall system 200, the worker may use a scanner to scan the container identifier of each container 220. Each container identifier may be associated with a visual identifier. For instance, the container identifier may encode a color, feature, or pattern of a visual identifier, and coordinator 240 may associate a visual identifier to each container 220 based on receiving the container identifiers for each container 220 and decoding the visual identifier from the container identifier. In some embodiments, the worker may provide input that associates a visual identifier with each scanned container identifier. Coordinator 240 may receive and store the container identifiers, and may track, using the container identifiers, which containers 220 are in use (e.g., allocated to rack 205 or moved from rack 205 with objects of a customer order), and which containers 220 are not in use (e.g., not allocated to rack 205 or are empty).

Coordinator 240 may modify (at 5) display device 230 to direct the worker in placing selected container 220-7 on rack 205 in the previous position of removed container 220-6. For instance, coordinator 240 may modify (at 5) display device 230 to present the visual identifier of container 220-7 and/or an instruction for the worker to move container 220-7 into the prior position of removed container 220-6 on rack 205.

In response, the worker may locate container 220-7, scan (at 6) the container identifier of container 220-7, and place (at 6') container 220-7 onto rack 205 in the position where container 220-6 was previously placed. Coordinator 240 may receive the scanned (at 6) container identifier to confirm that the correct container was placed on rack 205. Coordinator 240 may modify (at 7) display device 230 to illustrate an updated graphical representation for the arrangement of containers 220 tracked by virtual put wall system 200, and to allow the worker to visually confirm that the container allocation was correctly recorded by coordinator 240.

In some embodiments, the dynamic placement of containers 220 may include virtual put wall system 200 adapting to a worker-controlled allocation of containers 220. In some such embodiments, the worker controls which new containers 220 are inserted on rack 205, and may further set the positioning of each container 220 on rack 205.

Figure 7:
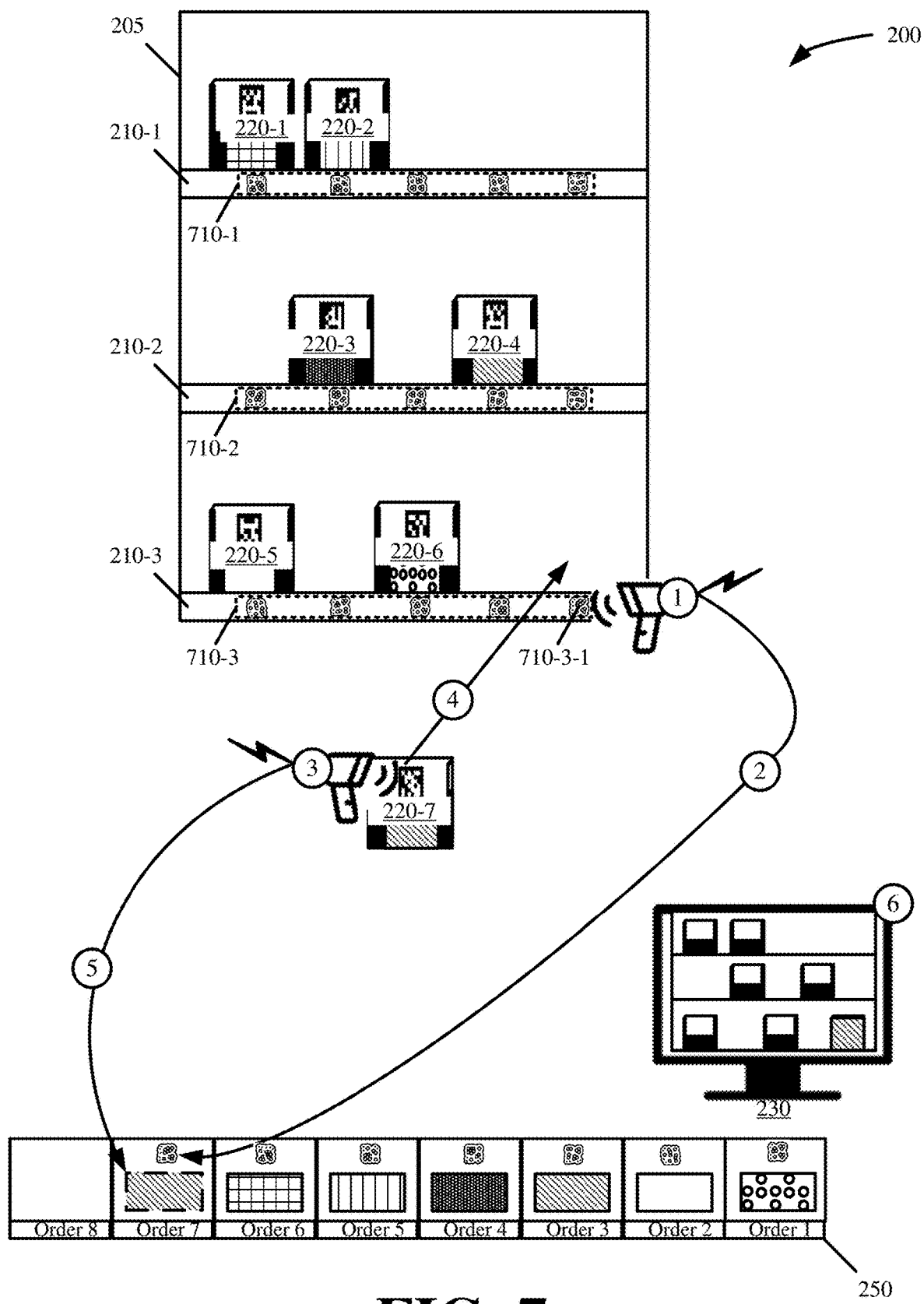
FIG. 7 illustrates a worker-controlled allocation of containers for virtual put wall system in accordance with some embodiments described herein.

FIG. 7 illustrates the worker-controlled allocation of containers 220 for virtual put wall system 200 in accordance with some embodiments described herein. In FIG. 7, rack 205 includes different sets of position identifiers 710-1, 710-2, and 710-3 (herein sometimes collectively referred to as "position identifiers 710" or individually as "position identifier 710") that are located along each shelf 210.

Each position identifier 710 may be a fiducial that encodes and/or is associated with a particular location on rack 205. Position identifiers 710 may be stickers that are placed at different locations along a front facing surface of shelves 210.

Coordinator 240 may create a mapping of position identifiers 710 to corresponding positions about a specific shelf 210 of rack 205. The mapping may be created based on inputs provided by input device 235 used by a worker. For instance, the worker may scan the position identifiers 710, and may input the locations of each position identifier 710 on rack 205.

The worker-controller allocation may commence in response to the worker scanning (at 1) position identifier 710-3-1 from the set of position identifiers 710-3. Position identifier 730-3-1 may be transmitted from the scanner to coordinator 240.

Coordinator 240 may query (at 2) database 250 using position identifier 710-3-1 in order to determine that the corresponding position on rack 205 is empty (e.g., no container is allocated to the corresponding position). Database 250 may track the customer order-to-container allocation as well as the container-to-rack position allocation.

The worker may scan (at 3) the container identifier of container 220-7, and may place (at 4) container 220-7 in the unallocated position identified by position identifier 710-3-1. Coordinator 240 may allocate (at 5) container 220-7 to the position identified by position identifier 710-3-1 based on the scanning (at 1 and 3) of position identifier 710-3-1 and the container identifier, and also tracking that the position associated with position identifier 710-3-1 was previously unallocated. Coordinator 240 may also allocate (at 5) a new and/or next pending customer order to container 220-7 so that objects of the next pending customer order can be aggregated from different locations in storage to container 220-7. Coordinator 240 may modify (at 6) display device 230 to visually confirm the container allocation with the worker.

As shown in FIG. 7, container 220-7 has the same visual identifier as container 220-4. Virtual put wall system 200 can support containers 220 with the same visual identifiers regardless of whether the allocation is the result of the coordinator-controlled allocation, the worker-controller allocation, or another allocation. Virtual put wall system 200 may use position identifiers 710 to track the different positions, allocations, and/or removals of containers 220 with the same visual identifier. For instance, by scanning a first position identifier and a first container identifier when placing a first container to a position on rack 205 that is identified by the first position identifier, coordinator 240 can track the positioning and visual identifier for that first container separate from other containers 220. Coordinator 240 may then visually differentiate between containers 220 with the same visual identifier by modifying display device 230 to identify containers 220 according to their visual identifiers and also their positions on virtual put wall 200 as was illustrated in FIG. 5 with the arrangement of graphical elements that match the physical arrangement of containers 220 on rack 205.

Figure 8:
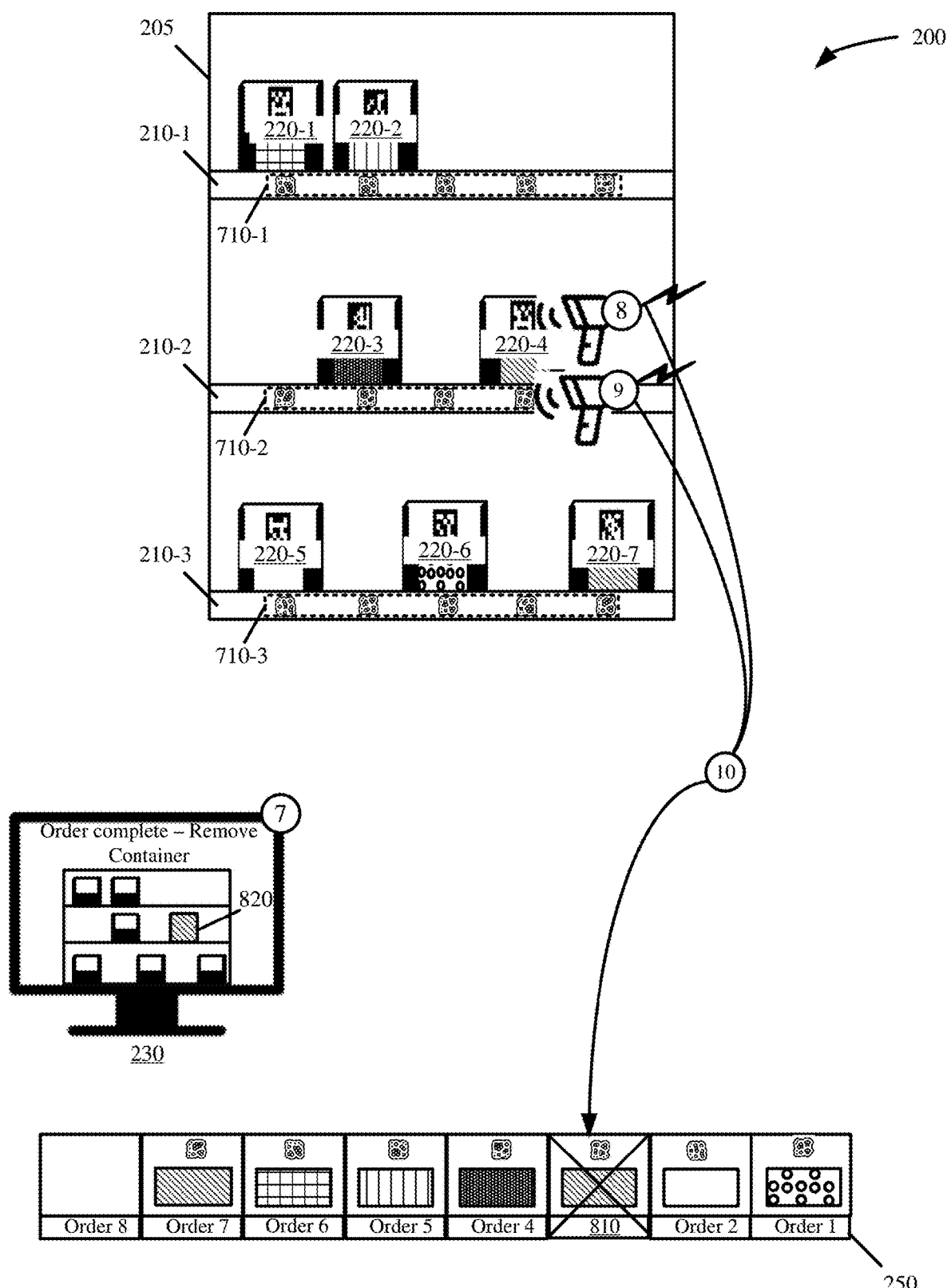
FIG. 8 illustrates an example of using the virtual put wall system to coordinate the removal of a container with a shared visual identifier in accordance with some embodiments described herein.

FIG. 8 illustrates an example of using virtual put wall system 200 to coordinate the removal of a container with a shared visual identifier in accordance with some embodiments described herein. FIG. 8 may continue from FIG. 7. In particular, FIG. 8 illustrates virtual put wall system 200 after container 220-7, with the same visual identifier as container 220-4, is placed at a different position on rack 205.

Coordinator 240 may detect that all objects of customer order 810 have been placed in container 220-4 such that customer order 810 is complete. Coordinator 240 may modify (at 7) display device 230 to present the visual identifier of container 220-4 and also to present graphical representation 820 for container 220-4 in a position corresponding to the position of container 220-4 on rack 805. For instance, display device 230 may present (at 8) the visual identifier of container 220-4 at a position corresponding to the second leftmost position on shelf 210-2.

The worker confirms removal of the current container, by scanning (at 8) the container identifier of container 220-4 prior to removal. In some embodiments, the container identifier of container 220-4 may be different from the container identifier of container 220-7 even through the containers have the same visual identifier. In some embodiments, the container identifiers may be the same, and so the worker may also scan (at 9) the position identifier where container 220-4 is located.

Coordinator 240 may receive (at 10) the one or more scanned identifiers, and query database 250 using the one or more scanned identifiers. From the query, coordinator 240 may confirm that the correct container was removed from virtual put wall 200. Coordinator 240 may also update (at 10) database 250 to record that customer order 810 associated with container 220-4 is complete, and that container 220-4 has been removed from rack 205 such that the scanned (at 10) position identifier is no longer associated with container 220-4.

Virtual put wall system 200 may support other dynamic coordinator-controlled or worker-controlled allocation of containers 220 on rack 205. In some embodiments, virtual put wall system 200 supports a hybrid coordinator and worker-controlled allocation of containers 220.

Figure 9:
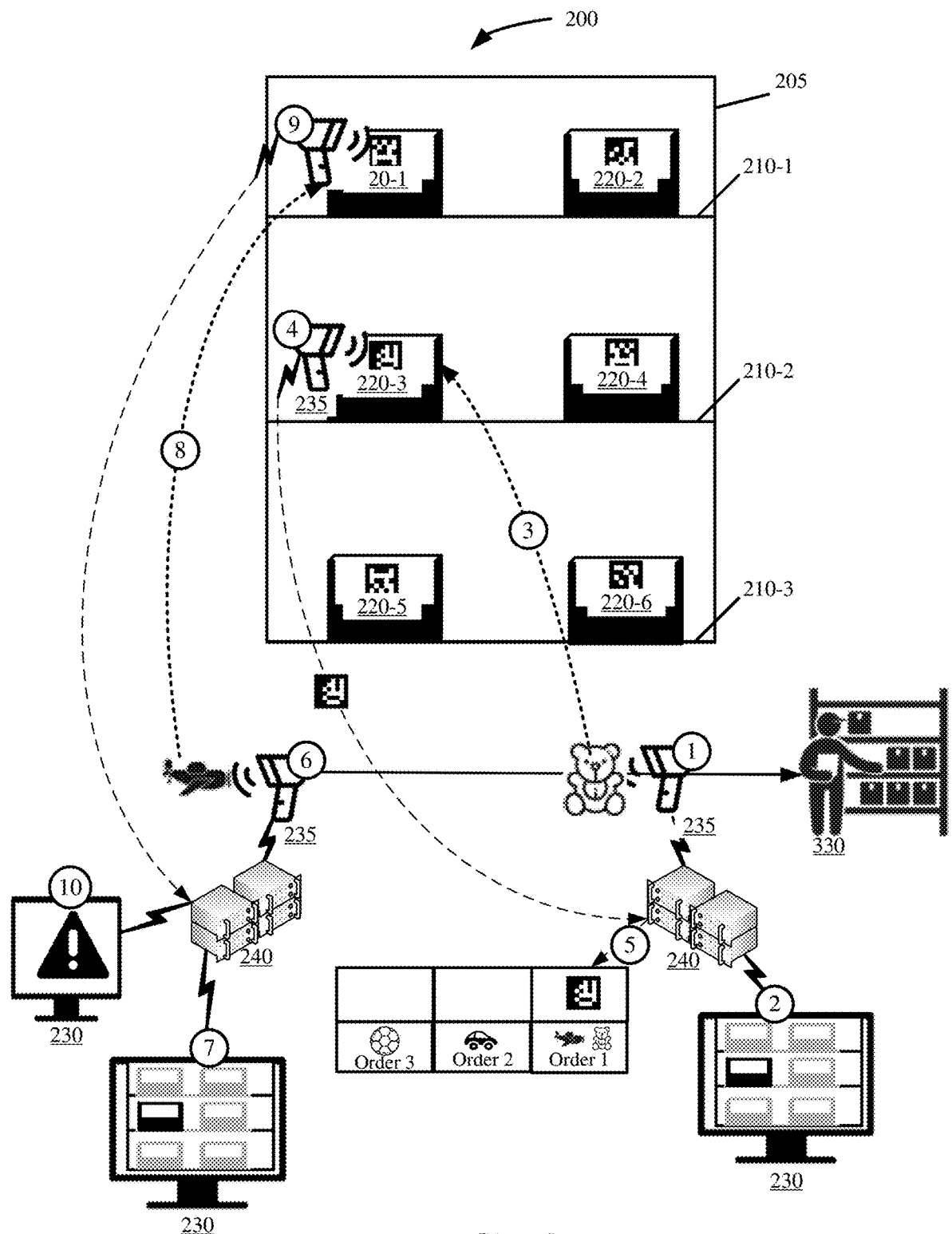
FIG. 9 illustrates an example of the hybrid-controlled allocation of containers in accordance with some embodiments described herein.

FIG. 9 illustrates an example of the hybrid-controlled allocation of containers in accordance with some embodiments described herein. Worker 330 may equally distribute containers 220 across shelving 210 of rack 205 (e.g., two containers on each shelf 210) without scanning any identifiers or providing any information about the container allocation to coordinator 240.

Worker 330 may receive a first object, may scan (at 1) an identifier of the first object using input device 235, and may provide the scanned identifier to coordinator 240 using input device 235.

Coordinator 240 may determine that the first object is part of a first customer order based on the scanned identifier, and may determine that the first customer order should be aggregated in the leftmost container on shelf 210-2. Accordingly, coordinator 240 may change (at 2) display device 230 to identify or otherwise differentiate the leftmost container on shelf 210-2.

Worker 330 may place (at 3) the first object in container 220-3, may scan (at 4) a container identifier of container 220-3 using input device 235, and may provide the container identifier of container 220-3 to coordinator 240. Coordinator may dynamically map (at 5) or associate the scanned container identifier for container 220-3 to the leftmost container on shelf 210-2.

Accordingly, when worker 330 receives a second object of the same first customer order and provides (at 6) an identifier of the second object to coordinator 240, coordinator 240 may again determine that the second object is part of the first customer order based on the scanned identifier. Coordinator 240 may further determine that the first customer order was previously aggregated in the leftmost container on shelf 210-2, and may again change (at 7) display device 230 to visually differentiate the leftmost container on shelf 210-2 from other containers.

Coordinator 240 may now verify, based on the container identifier of container 220-3 provided after placement of the first object, if worker 330 places the second object in the correct container (e.g., container 220-3). For instance, if worker 330 incorrectly places (at 8) the second object in container 220-4, and scans (at 9) the container identifier for container 220-1, coordinator 240 may detect that the second object and the first object of the first customer order were placed in different containers and may notify (at 10) worker 330 of the error. Otherwise, if worker 330 places the second object in container 220-3, and provides a scan of the container identifier for container 220-3 to coordinator 240, coordinator may determine that the container identifier provided after placement of the first and second objects matches, and that the first and second objects of the first customer order have been aggregated to the same container 220-3.

FIG. 9 and the hybrid-controlled allocation of containers presented therein illustrate how virtual put wall system 200 can be adapted and used in conjunction with containers 220 that do not have any visual identifiers (e.g., containers 220 with the same visual appearance). Instead of the visual identifiers, containers 220 in FIG. 9 may have container identifiers (e.g., barcodes or fiducials that workers cannot readily distinguish). Alternatively, virtual put wall system 200 can be adapted and used in conjunction with containers that have no visual identifiers or container identifiers, provided that shelving 210 of rack 205 are modified to have position identifiers under where containers 220 are placed. In this case, worker 330 scans the position identifier under the container that an object is placed, and coordinator 240 uses the position identifiers to dynamically map where and track where different customer orders are aggregated.

In some embodiments, virtual put wall system 200 may automatically scan identifiers for objects and/or containers 220 that worker 330 interacts with. In some such embodiments, one or more cameras and/or other sensors may be attached to rack 205. The sensors may detect objects that are placed into or removed from a container 220. The sensors may also detect when containers 220 are removed from rack 205, or new containers 220 are inserted into rack 205. In particular, the sensors may provide horizontal and vertical scanners that scan identifiers of objects and/or containers that are placed onto or removed from rack 205, and that can further determine the location about rack 205 where an identifier was scanned.

Since virtual put wall system 200 is not tied to any particular rack 205, shelving 210, containers 220, and/or other equipment, virtual put wall system 200 may be scaled based on need. For instance, an operator may want to simultaneously fulfill more orders than the number of containers 220 supported by one rack 205. In some such embodiments, virtual put wall system 200 may scale to support two or more racks 205 at the same time.

Figure 10:
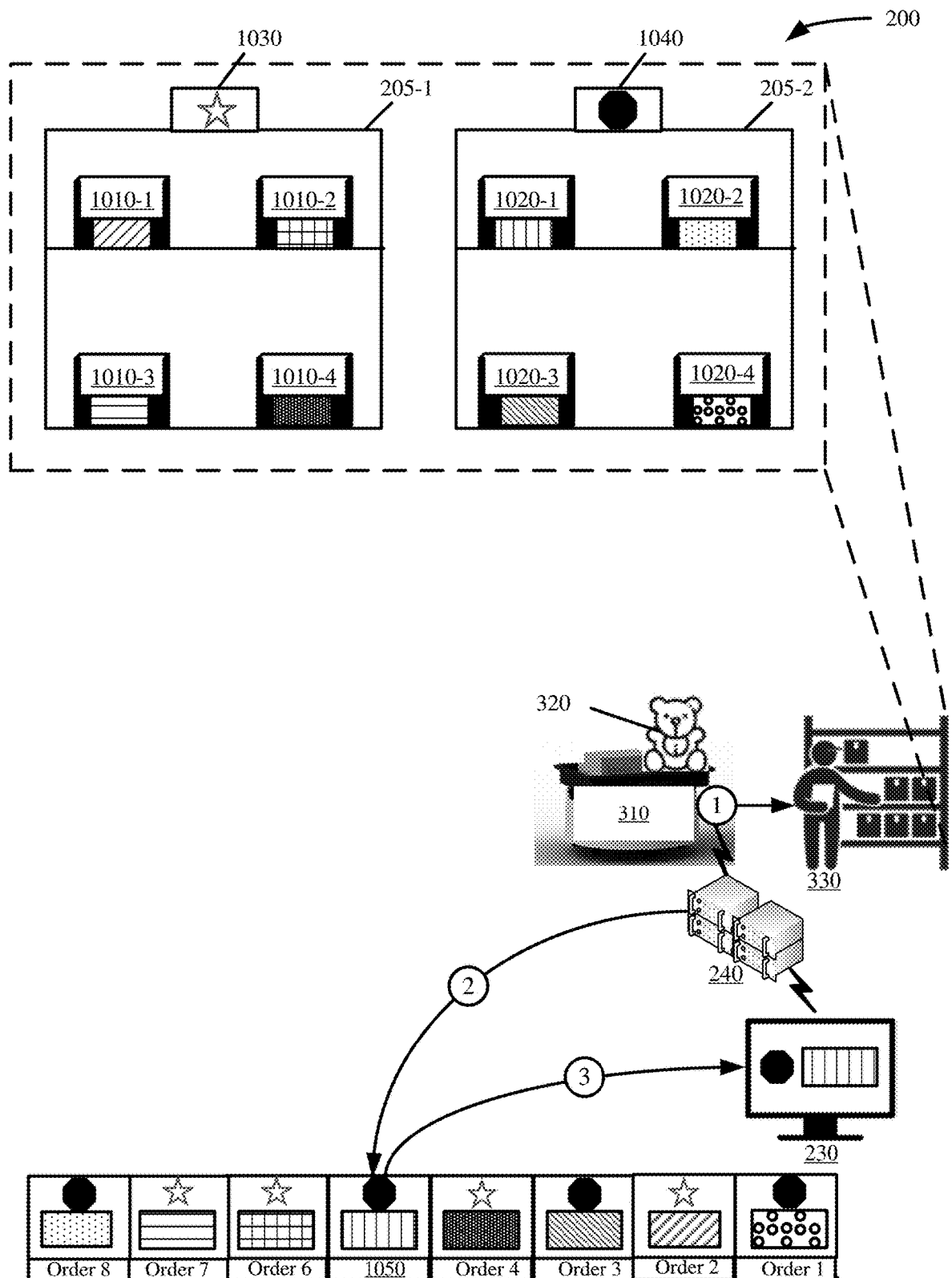
FIG. 10 illustrates scaling the virtual put wall system to support multiple racks in accordance with some embodiments described herein.

FIG. 10 illustrates scaling virtual put wall system 200 to support multiple racks 205 in accordance with some embodiments described herein. As shown in FIG. 10, virtual put wall system 200 includes first rack 205-1 and second rack 205-2. First rack 205-1 contains containers 1010-1, 1010-2, 1010-3, and 1010-4 that are associated with a first set of customer orders, and second rack 205-2 contains containers 1020-1, 1020-2, 1020-3, and 1020-4 that are associated with a different second set of customer orders. Each container 1010 and 1020 may have a different visual identifier. Moreover, first rack 205-1 may have first visual identifier 1030 that is different than second visual identifier 1040 of second rack 205-2.

First visual identifier 1030 and second visual identifier 1040 may again include different salient queues with which worker 330 can differentiate between the two racks. First visual identifier 1030 and second visual identifier 1040 may include stickers, lights, and/or signage with one or more different features, patterns, colors, shapes, and/or visual characteristics.

Coordinator 240, via database 250, may track the allocation of customer orders to containers 1010 and 1020, the visual identifier of each container 1010 and 1020, and also the allocation of containers 1010 to rack 205-1 and containers 1020 to rack 205-2. Accordingly, in response to robot 310 delivering object 320 to the location of racks 205-1 and 205-2, and/or to worker 330, robot 310 and coordinator 240 may exchange (at 1) a message that includes an object identifier of object 320. Alternatively, worker 330 may provide the identifier of object 320 to coordinator 240 by using input device 235 to scan the identifier of object 320.

Coordinator 240 may query (at 2) database 250 with the object identifier in order to determine that object 320 is part of customer order 1050. From the query (at 2), coordinator 240 may also determine that customer order 1050 is compiled using container 1020-1 on rack 205-2. Additionally, coordinator 240 may obtain the visual identifier of container 1020-1 as well as the visual identifier for rack 205-2.

Coordinator 240 may modify (at 3) display device 230 to instruct worker 330 to place object 320 into container 1020-1 on rack 205-2 by displaying the visual identifier of container 1020-1 and rack 205-2. In some embodiments, coordinator 240 may modify (at 3) display device 230 to present additional information including graphical representations of each rack so as to further differentiate between the racks and/or containers.

FIG. 10 demonstrates that virtual put wall system 200 can scale via a multi-tiered identification of a task, and is not limited to a particular configuration. The scaling can occur at any time. For instance, virtual put wall system 200 may initially be configured with first rack 205-1 during a first time when demand is low. During a second time when demand is high, virtual put wall system 200 may be scaled to support both first rack 205-1 and second rack 205-2 so that more orders can be fulfilled during the second time.

The adaptability of virtual put wall system 200 also allows the system to support different equipment and/or workflows. In other words, virtual put wall system 200 may adapt to existing equipment and/or workflows at a site, rather than have the site modify its equipment and/or workflows to accommodate virtual put wall system 200.

Figure 11:
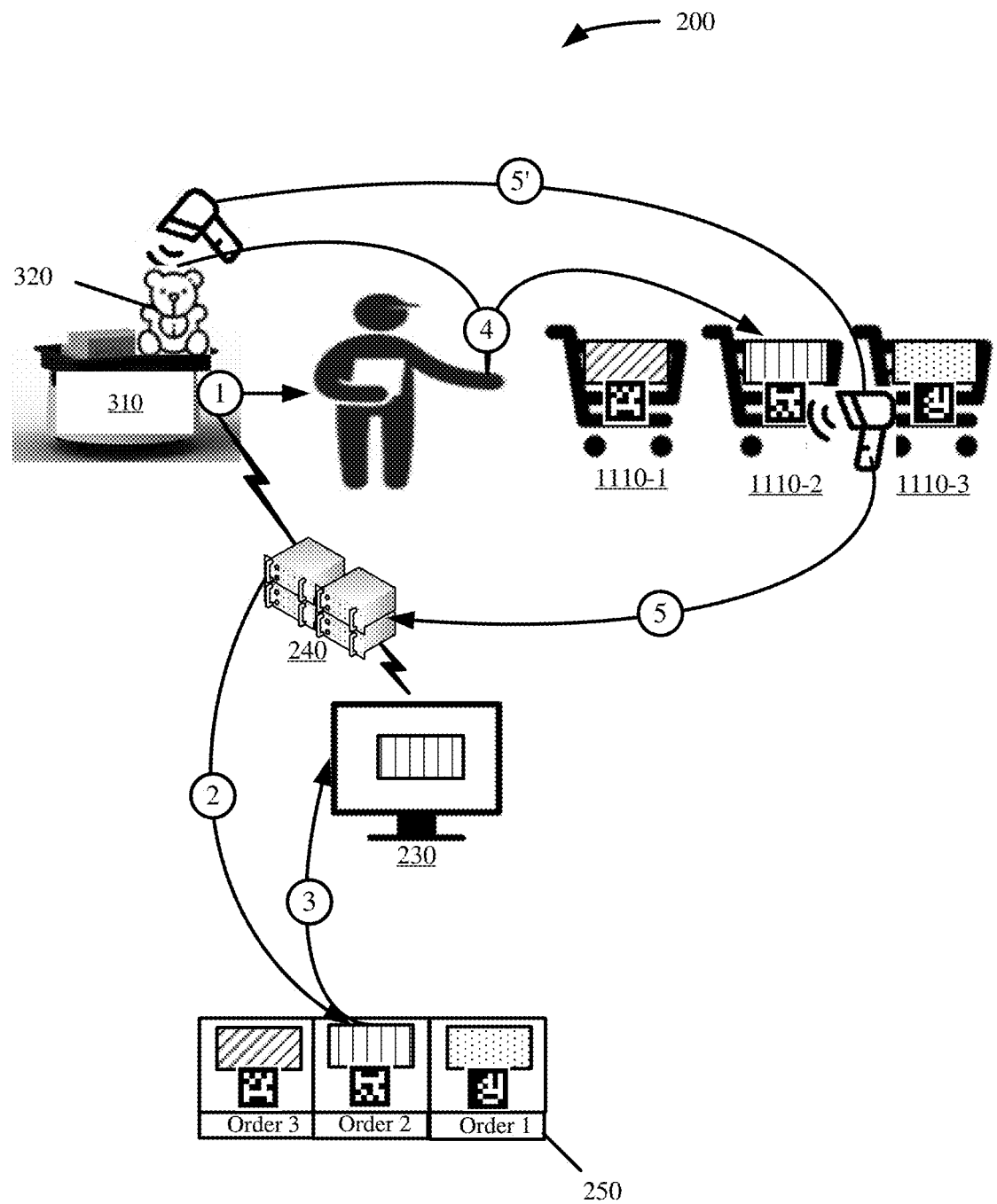
FIG. 11 illustrates an example of the virtual put wall system adapting to different equipment at a site in accordance with some embodiments described herein.

FIG. 11 illustrates an example of virtual put wall system 200 adapting to different equipment at a site in accordance with some embodiments described herein. As shown in FIG. 11, the site does not use racks 205. Instead, the site uses carts 1110-1, 1110-2, and 1110-3 (herein sometimes collectively referred to as "carts 1110" or individually as "cart 1110") for sorting and/or compiling objects of different customer orders.

Each cart 1110 may have a different visual identifier and/or a different fiducial. The visual identifiers and/or fiducials may be attached, stuck on, or otherwise coupled to carts 1110.

Coordinator 240 easily adapts to the different equipment by storing in database 250 the visual identifier-to-cart assignment, the cart-to-customer order allocation, and/or the fiducial-to-cart assignment. Accordingly, when robot 310 delivers object 320 to worker 330 and/or a corresponding destination location, robot 310 and coordinator 240, or input device 235 and coordinator 240, may exchange (at 1) an object identifier that identifies object 320.

Coordinator 240 may query (at 2) database 250 using the object identifier. Based on the query (at 2), coordinator 240 may determine that the object identifier is linked to object 320, that object 320 is part of a particular customer order, and that the particular customer order is assigned to cart 1110-2. Coordinator 240 may obtain the visual identifier for cart 1110-2 as a result of the query (at 2), and may modify (at 3) display device 230 to present the visual identifier for cart 1110-2. Worker 330 may match the visual identifier presented on display device 230 to the visual identifier of cart 1110-2 before transferring (at 4) object 320 into cart 1110-2.

To verify that the task was completed correctly, worker 330 may scan (at 5) the cart identifier of cart 1110-2 before or after placing object 320 into cart 1110-2. Worker may also scan (at 5') an object identifier of object 320. The scanned identifiers may be wirelessly transmitted to coordinator 240 via a wireless network. Coordinator 240 can then update database 250 and status of the particular customer order.

Figure 12:
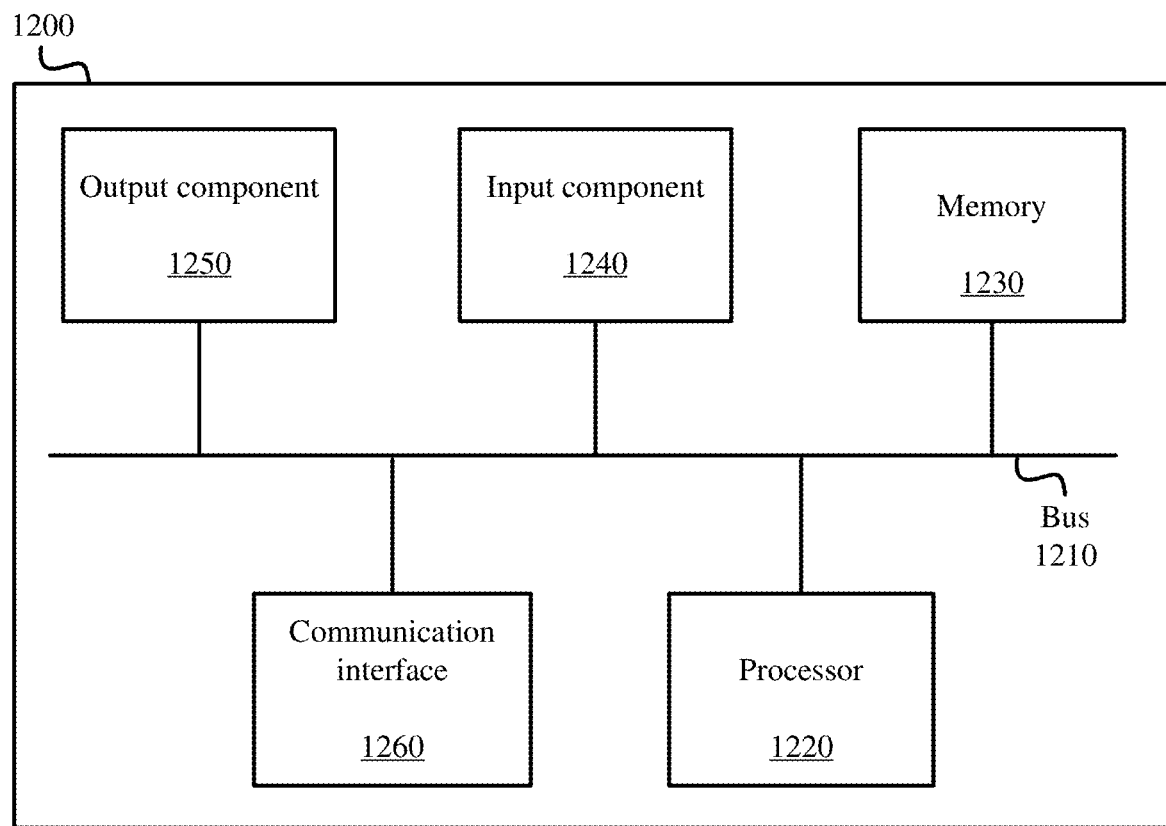
FIG. 12 illustrates example components of one or more devices, according to one or more embodiments described herein.

FIG. 12 is a diagram of example components of device 1200. Device 1200 may be used to implement display device 230, coordinator 240, database 250, and/or robots 310. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device for transforming a storage apparatus with one or more shelves into a virtual put wall with visual guided order fulfillment, the device comprising:

a non-transitory computer-readable medium storing a set of processor-executable instructions; and one or more processors configured to execute the set of processor-executable instructions, wherein executing the set of processor-executable instructions causes the one or more processors to:

track different visual identifiers on a front side of a plurality of containers that are distributed across the shelves of the storage apparatus, wherein each container of the plurality of containers is visually differentiated from other containers of the plurality of containers by a different visual identifier on the front side of that container and is used to aggregate one or more objects ordered as part of a different customer order;

receive a wireless message comprising an object identifier that identifies a particular object that is transferred before the storage apparatus;

determine, based on the object identifier, that the particular object is part of a particular customer order;

determine an allocation of the particular customer order to a particular container of the plurality of containers distributed across the shelves of the storage apparatus;

obtain a particular visual identifier of the particular container based on said tracking of the different visual identifiers, wherein the particular visual identifier differentiates the particular container from the other containers distributed across the shelves of the storage apparatus; and provide a visual guide on a display that directs transfer of the particular object to the particular container, wherein providing the visual guide comprises modifying the display to present one or more of an image, pattern, or color that exactly matches the particular visual identifier on the front side of the particular container and that visually isolates the particular container from the other containers distributed across the shelves of the storage apparatus.

2. The device of claim 1, wherein the processor-executable instructions further include processor-executable instructions to:
receive a message comprising a container identifier of the particular container after providing the visual guide, wherein the container identifier is different than the particular visual identifier of the particular container; and
remove the particular object as a missing item of the particular customer order in response to receiving the message comprising the container identifier.

3. The device of claim 2, wherein the processor-executable instructions further include processor-executable instructions to:
determine that the particular customer order has no missing items; and
modify the display to present the particular visual identifier with an instruction to remove the particular container from the storage apparatus.

4. The device of claim 3, wherein the processor-executable instructions further include processor-executable instructions to:
receive a different container identifier for a second container;
allocate a new customer order to the second container; and
update the tracking of the visual identifiers by removing the particular visual identifier of the particular container, and by adding a new visual identifier of the second container.

5. The device of claim 1, wherein the processor-executable instructions further include processor-executable instructions to:
track an arrangement of the plurality of containers across the shelves of the storage apparatus, wherein tracking the arrangement comprises determining a position of each container with respect to other containers of the plurality of containers about the shelves of the storage apparatus; and
wherein the processor-executable instructions to provide the visual guide comprise processor-executable instructions to:
present a graphical representation of the storage apparatus on the display with a plurality of container graphical elements in an arrangement that mirrors the arrangement of the plurality of containers across the shelves of the storage apparatus; and
present the particular visual identifier over a particular graphical element at a position in the graphical representation that matches a position of the particular container relative to other containers of the plurality of containers about the shelves of the storage apparatus.

6. The device of claim 1, wherein the processor-executable instructions further include processor-executable instructions to:
track an arrangement of the plurality of containers across the shelves of the storage apparatus, wherein tracking the arrangement comprises determining a position of each container with respect to other containers of the plurality of containers about the shelves of the storage apparatus; and
update the display to identify removal of the particular container from the arrangement in response to receiving a message comprising a container identifier of the particular container.

7. The device of claim 6, wherein the processor-executable instructions further include processor-executable instructions to:
update the display to add a new visual identifier of a different second container in place of the particular container in response to receiving a second message comprising a different container identifier of the second container.

8. The device of claim 1, wherein the processor-executable instructions further include processor-executable instructions to:
determine that the storage apparatus storing the particular container is a first storage apparatus from a plurality of storage apparatus, wherein each storage apparatus of the plurality of storage apparatus is visually differentiated from other storage apparatus of the plurality of storage apparatus by a different visual storage apparatus identifier; and
modify the display to present a visual storage apparatus identifier of the first storage apparatus in conjunction with the particular visual identifier of the particular container.

9. The device of claim 1, wherein the processor-executable instructions further include processor-executable instructions to:
map a plurality of position identifiers placed across the shelves of the storage apparatus; and
map the particular container to a particular position on the shelves of the storage apparatus in response to a message comprising the particular visual identifier of the particular container and a position identifier that is mapped to the particular position.

10. A virtual put wall system for visual guided order fulfillment, the system comprising:
a display device;
a database that stores a mapping between each customer order of a plurality of customer orders and a different container of a plurality of containers distributed across one or more shelves of a storage apparatus, and that stores for each container, one or more of an image, pattern, or color corresponding to a different visual identifier on a front side of that container; and
a coordinating device comprising:
one or more processors configured to:
detect retrieval of an object from a storage location to a position before the storage apparatus;
determine that the object belongs to a particular customer order of the plurality of customer orders;
select, based on the mapping, a particular container from the plurality of containers that is used to store objects of the particular customer order;
obtain, from the database, a particular visual identifier of the particular container, wherein the particular visual identifier differentiates the particular container from other containers of the plurality of containers distributed across the shelves of the storage apparatus; and
provide a visual guide on the display device that directs transfer of the object to the particular container, wherein providing the visual guide comprises modifying the display device to present one or more of an image, pattern, or color that exactly matches the particular visual identifier on the front side of the particular container and that visually differentiates the particular container from the other containers distributed across the shelving of the storage apparatus.

11. The system of claim 10 further comprising a plurality of container identifiers that are different than each visual identifier on the front side of each container, each container identifier of the plurality of container identifiers attached to a different container of the plurality of containers, wherein each container identifier encodes a value that uniquely identifies a different container, and wherein each visual identifier is one or more of an image, pattern, or color that visually differentiates one container from the other containers.

12. The system of claim 11, wherein the database further stores a second mapping between each container identifier of the plurality of container identifiers and a different container of the plurality of containers, and wherein the one or more processors are further configured to:
  receive a particular container identifier of the particular container in response to modifying the display device;
  detect placement of the object in the particular container based on receiving the particular container identifier; and
  modify the particular customer order in response to detecting the placement of the object in the particular container.

13. The system of claim 12 further comprising a portable scanner, the portable scanner scanning the particular container identifier and wirelessly transmitting the particular container identifier to the coordinating device.

14. The system of claim 11 further comprising a plurality of position identifiers attached to the shelves of the storage apparatus and aligned with different positions of the storage apparatus.

15. The system of claim 14, wherein the one or more processors are further configured to:
  track an arrangement of the plurality of containers on the storage apparatus based on each container identifier of the plurality of container identifiers being matched to a different position identifier of the plurality of position identifiers.

16. The system of claim 15, wherein the one or more processors are further configured to:
  display, on the display device, a graphical representation corresponding to the arrangement of the plurality of containers, and the visual identifier of the particular container at a position in the graphical representation that corresponds to a position of the particular container in the arrangement.

17. The system of claim 10 further comprising at least one object retrieval robot that retrieves the object from the storage location, and wherein the one or more processors are further configured to:
  receive a message comprising an object identifier of the object from the object retrieval robot in response to the object retrieval robot retrieving the object from the storage location or delivering the object to the storage apparatus; and
  identify the object retrieved by the object retrieval robot based on the object identifier provided with the message.

18. A method comprising:
  tracking different visual identifiers on a front side of a plurality of containers that are distributed across one or more shelves of a storage apparatus, wherein each container of the plurality of containers is visually differentiated from other containers of the plurality of containers by a different visual identifier on the front side of that container and is used to aggregate one or more objects ordered as part of a different customer order;
  receiving a wireless message from an object retrieval robot or a wireless device of a worker, the wireless message comprising an object identifier that identifies a particular object that is transferred before the storage apparatus or that is retrieved from a storage location by the object retrieval robot or the worker;
  identifying the particular object based on the object identifier provided with the wireless message;
  determining, based on one or more of the object identifier or said identifying of the particular object, that the particular object is part of a particular customer order;
  determining an allocation of the particular customer order to a particular container of the plurality of containers distributed across the shelves of the storage apparatus;
  obtaining a particular visual identifier of the particular container based on said tracking of the different visual identifiers, wherein the particular visual identifier differentiates the particular container from the other containers distributed across the shelves of the storage apparatus; and
  modifying a display to present one or more of an image, pattern, or color that exactly matches the particular visual identifier on the front side of the particular container and that visually isolates the particular container from the other containers distributed across the shelves of the storage apparatus.

19. The method of claim 18 further comprising:
  determining that the particular customer order specifies a defined quantity of the particular object with specific attributes, wherein the specific attributes specify the particular object in at least one specific size or specific color; and
  wherein modifying the display comprises presenting the quantity and the specific attributes of the particular object with one or more of the image, the pattern, or the color that exactly matches the particular visual identifier.

20. The method of claim 18 further comprising:
  tracking a first order with which a first set of the plurality of containers are positioned on a first shelf of the storage apparatus, and a second order with which a second set of the plurality of containers are positioned on a second shelf of the storage apparatus; and
  presenting a graphical representation of the storage apparatus with a first set of visual identifiers of the first set of containers displayed in the first order on a first row of the graphical representation, and a second set of visual identifiers of the second set of containers displayed in the second order on a second row of the graphical representation.

* * * * *